(12) United States Patent
Drautz et al.

(10) Patent No.: US 7,825,557 B2
(45) Date of Patent: Nov. 2, 2010

(54) SPINDLE MOTOR HAVING A FLUID DYNAMIC BEARING SYSTEM AND A STATIONARY SHAFT

(75) Inventors: Frank Drautz, Weissach im Tal (DE); Martin Bauer, Villingen-Schwenningen (DE)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 12/313,901

(22) Filed: Nov. 25, 2008

(65) Prior Publication Data

US 2009/0140588 A1 Jun. 4, 2009

(30) Foreign Application Priority Data

Nov. 30, 2007 (DE) .................. 10 2007 058 151

(51) Int. Cl.
 *H02K 7/09* (2006.01)
(52) U.S. Cl. ..................... 310/90; 360/99.08
(58) Field of Classification Search ............ 310/90; 360/99.08
 See application file for complete search history.

(56) References Cited

U.S. PATENT DOCUMENTS

| | | | |
|---|---|---|---|
| 6,307,291 B1 * | 10/2001 | Iwaki et al. | 310/90 |
| 6,371,650 B1 | 4/2002 | Goto | |
| 6,917,130 B2 * | 7/2005 | Aiello et al. | 310/90.5 |
| 6,991,376 B2 | 1/2006 | Aiello | |
| 7,234,868 B2 | 6/2007 | Tiller | |
| 7,309,937 B2 * | 12/2007 | Hoffmann et al. | 310/90 |
| 2003/0174915 A1 * | 9/2003 | Parsoneault et al. | 384/110 |
| 2003/0197438 A1 * | 10/2003 | Oku | 310/90 |
| 2005/0225187 A1 * | 10/2005 | Hafen et al. | 310/90 |
| 2006/0255672 A1 * | 11/2006 | Flores et al. | 310/90 |
| 2007/0133911 A1 | 6/2007 | Nishimoto | |
| 2007/0147716 A1 * | 6/2007 | Kull et al. | 384/100 |
| 2007/0222314 A1 * | 9/2007 | Drautz | 310/90 |
| 2007/0290559 A1 * | 12/2007 | Hendriks et al. | 310/90 |
| 2008/0239570 A1 * | 10/2008 | Kumoi et al. | 360/135 |
| 2009/0102300 A1 * | 4/2009 | Rehm et al. | 310/90 |

FOREIGN PATENT DOCUMENTS

| | | |
|---|---|---|
| JP | 11055917 | 2/1999 |
| JP | 11055917 A | 2/1999 |
| JP | 2003333798 | 11/2003 |

\* cited by examiner

*Primary Examiner*—Quyen Leung
*Assistant Examiner*—Terrance Kenerly
(74) *Attorney, Agent, or Firm*—Cooper & Dunham LLP

(57) ABSTRACT

The invention relates to a spindle motor having a fluid dynamic bearing system that contains a rotor component taking the form of an integrated hub/bearing bush arrangement which encloses a straight, stationary shaft, which in turn is connected at both its ends to axially aligned bearing components, formed in such a way that they seal the fluid dynamic bearing system formed between the shaft and the rotor component and open at both ends. The open ends of the bearing gap are sealed by capillary seals or pumping seals or a combination of capillary and pumping seal.

13 Claims, 7 Drawing Sheets

SPINDLE MOTOR HAVING A FLUID DYNAMIC BEARING SYSTEM AND A STATIONARY SHAFT

BACKGROUND OF THE INVENTION

The invention relates to a spindle motor having a fluid dynamic bearing system and a stationary shaft. These kinds of spindle motors are used, for example, for driving disk drives.

DESCRIPTION OF THE PRIOR ART

Spindle motors having fluid dynamic bearing systems can essentially be divided into two different groups, that is to say, into two different designs: motors having a rotating shaft and a bearing system that is usually open at only one end (e.g. a single plate design) and motors having a stationary shaft. A significant advantage afforded by spindle motors having a stationary shaft is the possibility of not only fixing the spindle motor at one end of the stationary shaft to the baseplate of a housing, but also of connecting it at the other end of the shaft, for example, to a housing cover. These types of motors thereby acquire appreciably greater structural stiffness, making them particularly suitable for use, for example, in hard disk drives having more demanding or special requirements, as is the case nowadays in many mobile applications having ever increasing data densities in combination with vibrations occurring during normal operation. Another important field of application for spindle motors having a stationary shaft is in hard disk drives in which especially low operating noise is required, where it is possible, in particular, to reduce the transmission and emission of vibrations generated by the electromagnetic forces of the motor by this greater structural stiffness.

The construction, and especially the sealing of a spindle motor having a stationary shaft and a fluid dynamic bearing system open at both ends are generally more complex than for a spindle motor having a rotating shaft. Particularly the manufacture of the bearing components of the fluid bearing, such as the bearing bush and the shaft, having tolerances in the sub-micrometer range and the precise and stable connection of the small individual parts of the motor create various problems (e.g. axial runout of the rotor component/change due to external stress) for the small form factors (2.5, 1.8 or 1 inch drives) that are now finding increasing application.

SUMMARY OF THE INVENTION

It is the object of the invention to provide a type of spindle motor that contains a fluid dynamic bearing system having a stationary shaft fixed at both ends and that consists of only a few parts that are relatively easy to manufacture and can be reliably assembled within the required tolerances in the micrometer and sub-micrometer range, and which is also sufficiently robust in withstanding external jolts—an indispensable requirement for mobile applications.

This object has been achieved by a spindle motor having a fluid dynamic bearing system that comprises a stationary shaft which is held in a baseplate, a single-piece rotor component rotatably supported with respect to the shaft, two radial bearings, each formed between the opposing radial bearing surfaces of the shaft and of the rotor component, at least one axial bearing formed between the respective opposing axial bearing surfaces of the rotor component and a first bearing component or of the rotor component and a second bearing component respectively. A bearing gap open at both ends and filled with bearing fluid is provided that separates the adjoining surfaces of the shaft, the rotor component and the bearing components from one another, and an electromagnetic drive system to drive the rotor component in rotation.

The spindle motor according to the invention having a fluid dynamic bearing system is characterized by a rotor component taking the form of a hub having an integrated bearing bush that encloses a straight, stationary shaft, which in turn is connected at both its ends to axially aligned bearing components, formed in such a way that they seal the fluid dynamic bearing system formed between the shaft and the rotor component and open at both ends. The rotor component comprises a hollow cylindrical section that takes over the function of the bearing bush and a bell-shaped section integrally formed with the hollow cylindrical section as one piece that forms the hub of the spindle motor.

There are preferably two radial bearings provided in the fluid dynamic bearing system that are formed by opposing bearing surfaces of the shaft and of the rotor component extending axially in the direction of the rotational axis. At least one axial bearing of the bearing system is formed by opposing axial bearing surfaces of the rotor component and a first bearing component or of the rotor component and a second bearing component respectively. The adjoining surfaces of the shaft, the rotor component and the bearing components are separated from one another by a bearing gap open at both ends and filled with bearing fluid. The bearing surfaces of the radial bearings and the at least one axial bearing are provided with bearing grooves using a well-known method and separated from one another by the bearing gap. As soon as the bearing surfaces rotate with respect to one another, the bearing grooves generate a pumping effect on the bearing fluid. The bearing grooves are disposed such that they pump the bearing fluid in the bearing gap in a defined direction, resulting in the build up of dynamic pressure in the bearing gap, thus giving the bearing its load-carrying capacity and separating the bearing surfaces from one another. The motor moreover comprises an electromagnetic drive system for driving the rotor component.

In the case where there is only one single axial bearing that generates a bearing force in only one axial direction, the required counterforce in the opposite axial direction may be generated by an offset of the rotor magnet with respect to the stator winding in an axial direction and/or by a ferromagnetic ring that is mounted below the rotor magnet.

In a preferred embodiment of the invention, the bearing system merely comprises a total of four mechanical components, three components being stationary components and only one rotating, mechanical rotor component taking the form of a hub/bearing bush arrangement being provided. Thanks to the small number of parts, the bearing system can be very easily constructed and, in particular, the parts can be made and machined relatively easily and at low cost.

To seal the bearing gap open at both ends, various sealing concepts may be provided according to the invention. For one, the rotor component may have surfaces that are formed such that, together with the surfaces of a bearing component, they form a capillary gap seal (labyrinth seal) that adjoins the bearing gap and is partly filled with bearing fluid. The gap seal may be formed between an inner circumferential surface of the rotor component and an outer circumferential surface of the respective bearing component. Conversely, it is also possible for the gap seal to be formed between an outer circumferential surface of the rotor component and an inner circumferential surface of the bearing component. Depending on the design of the bearing and the availability of space within the bearing, the gap seal may be aligned vertically or horizontally to the rotational axis. The gap seal may be augmented or replaced by a dynamic pumping seal, the surfaces of the rotor component and of a bearing component forming the seal being provided with appropriate pumping patterns (grooved patterns), which, on rotation of the bearing, generate a pumping effect on the bearing fluid found in the sealing gap directed into the interior of the bearing.

The other end of the bearing gap can be sealed by a capillary seal, preferably a tapered capillary seal, which is formed by the respective surfaces of the rotor component and the opposing surfaces of a bearing component. The capillary seal may be formed between an inner circumferential surface of the rotor component and an outer circumferential surface of the bearing component. However, the capillary seal may also be formed between an outer circumferential surface of the rotor component and an inner circumferential surface of the bearing component. Depending on the availability of space and the design, the capillary seal may be disposed vertically or horizontally to the rotational axis. In the case of spindle motors made for high rotational speeds, it is preferable if the capillary seal is disposed vertically because in this way the centrifugal forces acting on the bearing fluid have less influence on the bearing fluid in the capillary seal.

In one embodiment of the invention, the surfaces of the rotor component and the bearing component that form the capillary seal are preferably aligned parallel to the rotational axis or inclined at an acute angle to the rotational axis. The respective angles of the surfaces defining the capillary gap must have different sizes, so as to give the capillary seal a tapered cross-section.

One embodiment of the invention provides for the capillary seal to be covered by an annular covering cap connected to the rotor component, the annular covering cap forming a labyrinth seal together with a bearing component. This goes to increase the certainty that no bearing fluid can leak out of the capillary seal. The annular covering cap may, of course, also be disposed on the bearing component. The rim of the covering cap may, for example, be L-shaped in cross-section.

According to another embodiment of the invention, the covering cap may be formed and fixed onto or into the rotor component in such a way that its inside circumference, together with an outside circumference of the associated bearing component, defines the gap of the capillary seal. In this case, the rim of the covering cap may be approximately Z-shaped in cross-section.

To allow the bearing fluid to circulate within the fluid bearing, the rotor component may have a recirculation channel that connects the axial bearing surfaces to each other. A recirculation channel need not be provided, however.

The invention is now described in more detail on the basis of several embodiments with reference to the drawings. Further advantages and characteristics of the invention can be derived from the following description.

DESCRIPTION OF PREFERRED EMBODIMENTS OF THE INVENTION

FIGS. 1 to 7 show various embodiments of spindle motors according to the invention, all the illustrated spindle motors essentially having the same basic construction. The spindle motors could be used for driving the storage disks of a hard disk drive.

Figure 1:
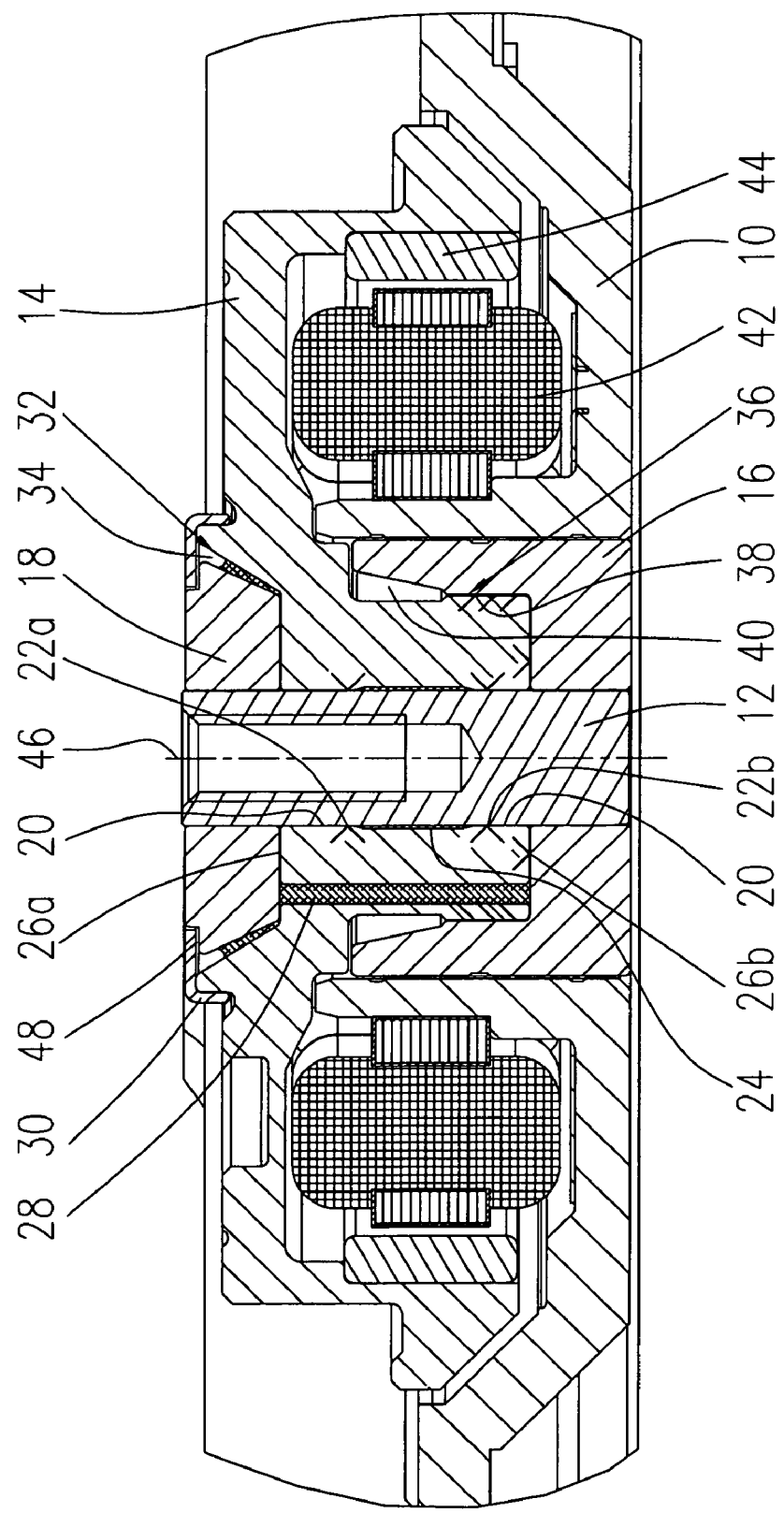
FIG. 1 shows a section through a first embodiment of the spindle motor according to the invention.

The spindle motor according to FIG. 1 comprises a baseplate 10 that has a substantially central cylindrical opening in which a first bearing component 16 is accommodated. The first bearing component 16 is approximately cup-shaped in form and comprises a central opening in which the shaft 12 is fixed. A second bearing component 18 is disposed at an upper end of the stationary shaft 12, the second bearing component 18 being preferably annular in shape. The above-mentioned components form the stationary components of the spindle motor. At its upper end, the shaft 12 may additionally be fixed to the housing of the spindle motor. The spindle motor comprises a single-piece rotor component 14 that is disposed in a space formed by the shaft 12 and the two bearing components 16, 18, the rotor component 14 being rotatable with respect to these parts. The upper bearing component 18 is accommodated in an annular recess in the rotor component 14. Adjoining surfaces of the shaft 12, the rotor component 14 and the bearing components 16, 18 are separated from one another by a bearing gap 20 open at both ends that is filled with bearing fluid, such as a bearing oil. The electromagnetic drive system of the spindle motor is formed in a well-known manner by a stator arrangement 42 disposed on the baseplate 10 and an annular permanent magnet 44 enclosing the stator arrangement at a spacing, the annular permanent magnet 44 being disposed on an inner circumferential surface of the rotor component 14.

The rotor component 14 of the spindle motor has a hollow cylindrical section that is designed in such a way that its inside circumference forms two cylindrical bearing surfaces that are separated by a groove 24 running in between. These bearing surfaces enclose the stationary shaft 12 at a distance of only a few micrometers (bearing gap 20) and are provided with appropriate grooved patterns, so that, together with the respective opposing bearing surfaces of the shaft 12, they form two radial bearings 22a and 22b.

Furthermore, axial bearing surfaces of the rotor component 14 adjoin these two radial bearings 22a, 22b towards the outside, the axial bearing surfaces taking the form of circular rings perpendicular to the rotational axis 46 that, together with the corresponding opposing bearing surfaces of the bearing components 16, 18 mounted on the shaft 12, form two axial bearings 26a and 26b. The axial bearings 26a, 26b are marked by grooved patterns using a well-known method that may be provided either on the rotor component 14, on the bearing components 16, 18 or on both parts. It could be advantageous if all the grooved patterns required for the radial bearings 22a, 22b and the axial bearings 26a, 26b are disposed on the rotor component 14, thus simplifying the manufacture of the bearing, particularly the manufacture of the shaft 12 and the two bearing components 16, 18.

The regions of the rotor component 14 adjoining the axial bearing regions 26a, 26b are designed such that they form seals 32 or 36 respectively together with the corresponding opposing surfaces of the bearing components 16, 18, the seals 32 or 36 sealing the fluid bearing system at both ends. To be more precise, the rotor component 14 is designed at one end such that a tapered gap 34 widening in an axial direction is created between the rotor component 14 and the corresponding bearing component 18. Alongside its function as a capillary seal 32, the gap 34 also acts as a fluid reservoir. The fluid reservoir supplies the amount of fluid necessary for the useful life of the bearing (evaporation) and acts as an equalizing volume for filling tolerances and any thermal expansion of the bearing fluid. The gap 34 is proportionally filled with bearing fluid. At the same time, the two surfaces forming the tapered gap 34, on the rotor component 14 and on the bearing component 18, may be inclined inwards or outwards with respect to the rotational axis 46. The capillary seal 32 is preferably covered by a covering cap 30 that is fixed to the rotor component 14 (or alternatively to the bearing component 18).

At the other end of the fluid bearing system, the rotor component 14 adjoining the second axial bearing 26b is designed such that, together with a corresponding opposing surface of the bearing component 16, it forms a narrow gap 38. Along the gap 38, appropriate grooved patterns are disposed on the surfaces of the rotor component 14, the bearing component 16 or both parts that form an active pumping seal 36 which seals the fluid bearing system at this end. Due to centrifugal forces generated during operation of the motor and acting on the bearing fluid, this pumping seal 36 is preferably made vertical in the direction of the rotational axis 46, abruptly widening at the outer end (capillary braking effect) and merging, for example, into a tapered space 40, which, during any shocks to the motor at standstill, for example, can take up bearing fluid, so that when the motor is next started, this fluid is fed back into the bearing region due to the pumping effect of the pumping seal 36. In addition, the space 40 may be fully or partly covered by a covering cap 30 or by parts of the rotor component 14.

To be able to perform the described functions and to ensure ease of assembly of the motor, the two bearing components 16, 18, which are fixedly connected to the shaft 12, by means, for example, of pressing, bonding or welding, are of course given an appropriate design. It may be particularly favorable to design one of the two bearing components, for example, part 16, to be cup-shaped having a raised rim, so that, together with an opposing surface of the rotor component 14, it forms a pumping seal 36 (or also a capillary seal 32) at its inner circumferential surface, and at its outside circumference it is connected to the baseplate 10. On the other hand, the simplest possible design for the bearing components 16, 18 may be advantageous, such as a stepped or even straight circular disk, like bearing component 18 for example.

To ensure continuous flushing of the bearing system with bearing fluid, the rotor component 14 may additionally be provided with a recirculation channel 28 that connects the sections of the bearing gap 20 associated with the two axial bearing surfaces 26a, 26b. The recirculation channel 28 can be easily realized, for example, by drilling through the rotor component 14 parallel to the rotational axis 46 of the motor and thus perpendicular to the axial bearing surfaces 26a, 26b before the final processing of the rotor component 14.

Since the entire rotor of the spindle motor (apart from magnet 44 and a covering cap 30 where applicable) consists merely of the rotor component 14, the position tolerance of the rotor surfaces, which are used, for example, as supporting surfaces for the storage disks of a hard disk drive, is with respect to the fluid bearing better than for a rotor consisting of several parts, and the mechanical stability is considerably greater. Moreover, the functional surfaces (bearing surfaces) of the fluid bearing system, all of which are located on one part, preferably the rotor component 14, can be relatively easily manufactured to the required precision. In particular, compared, for example, to a considerably smaller bearing bush of a conventional design, the rotor component 14 can be relatively easily clamped into a chuck and the final processing of almost all the bearing surfaces can be carried out without having to rechuck. What is more, it is now possible to dispense with the assembly of the rotor from several separate parts, which is difficult particularly for small form factors and inevitably associated with failures, and where the separate parts together have to incorporate all the functional surfaces necessary for a fluid bearing system with the required precision and additional, specially designed close-tolerance connecting regions.

The spindle motor according to FIG. 1 is characterized in that the tapered capillary seal is located at the "top" of the bearing between the rotor component 14 and the second bearing component 18. The gap 34 of the capillary seal is strongly inclined towards the outside with respect to the rotational axis 46, so that the capillary seal 32 can be made longer than if the gap 34 were aligned parallel to the rotational axis 46. The bearing can be easily filled with bearing oil directly through the gap 34 of the capillary seal 32, after which the covering cap 30 is mounted, the covering cap 30 additionally forming a labyrinth seal 48 together with an end face of the bearing component 18. The lower bearing component 16 is made cup-shaped, the pumping seal 36 being formed between the outside diameter of the rotor component 14 and the cup-shaped rim of the bearing component 16 in an axial direction. The gap 38 extends parallel to the bearing gap 20, but not in extension of the vertical section of the bearing gap 20. This arrangement makes it possible to achieve the largest possible distance between the two radial bearings 22a and 22b, together with a long pumping seal 36 length. At the end of the pumping seal 36, a protected space 40 is formed between an outside diameter of the rotor component 14 and an inside diameter of the bearing component 16. The cup-shape of the bearing component 16 also makes it possible for a very long joint length to be realized in its connection to the baseplate 10. This goes to produce a reliable connection between the baseplate 10 and the stationary parts of the motor that can be very precisely aligned.

Alongside the rotor component 14, the two bearing components 16 and 18 and a covering cap 30, the spindle motor (apart from the electromagnetic components 42 and 44) consists only of one other mechanical component, namely the straight shaft 12 that again is simple to manufacture. The motor can then be assembled extremely easily by simply passing the shaft 12 through the opening of the rotor component 14 and attaching the bearing components 16, 18 to the shaft 12 at the required position. This can then be followed by a standard procedure for filling the bearing fluid into the bearing gap, the mounting of the electromagnetic components 42, 44 and finally the installation of the assembly in the baseplate 10.

Figure 2:
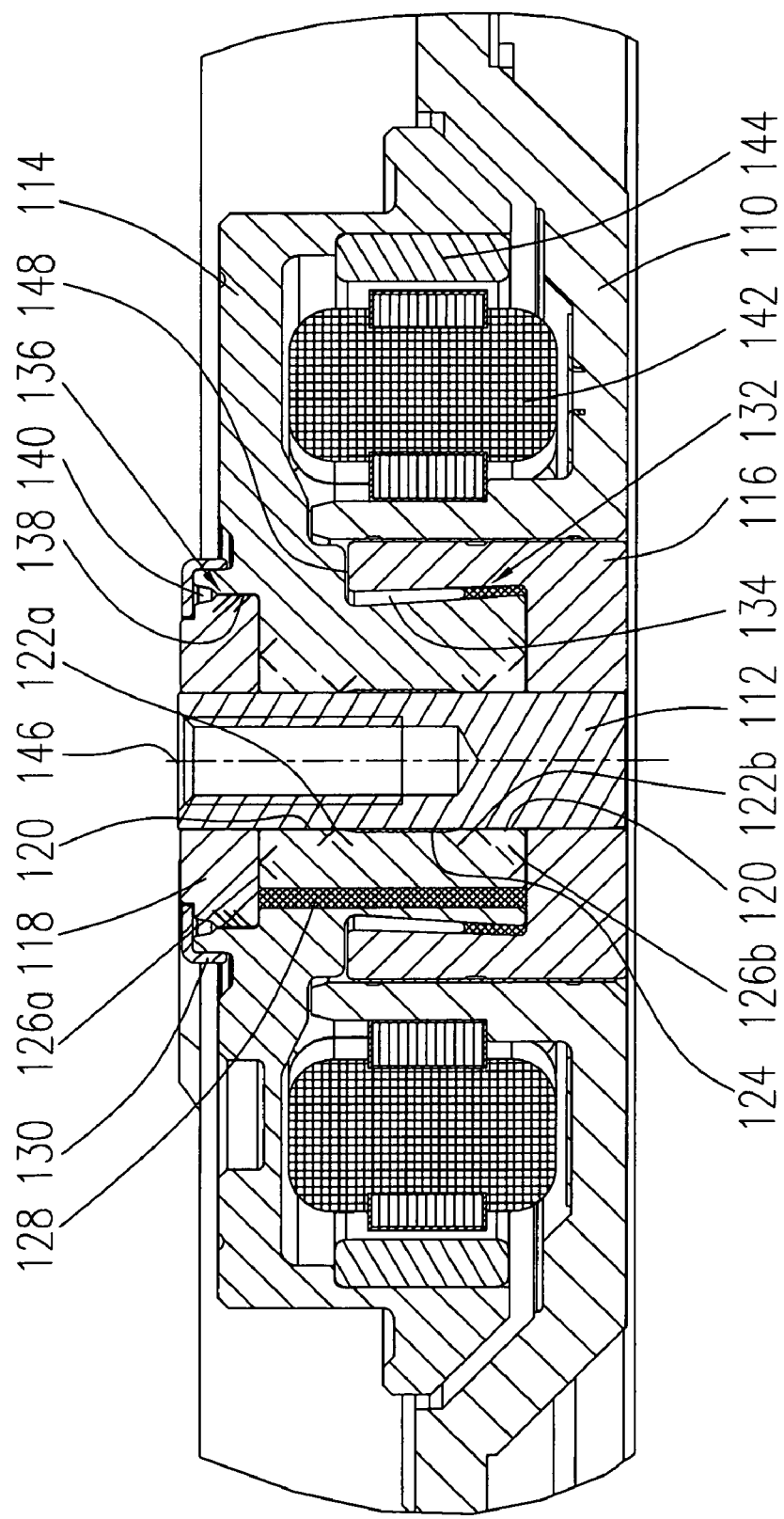
FIG. 2 shows a section through a second embodiment of the spindle motor according to the invention.

In FIG. 2, a spindle motor is illustrated in which identical components or components having the same functions as those in FIG. 1 are provided with the same reference numbers, these reference numbers being prefixed by the number "1" for purposes of differentiation.

The spindle motor according to FIG. 2 essentially differs from the spindle motor according to FIG. 1 by having a different sealing concept. Substantially the same description for the spindle motor of FIG. 1 applies to that of FIG. 2.

In FIG. 2, the pumping seal 136 is in the "upper" region of the spindle motor, and disposed here between the outside circumference of the second bearing disk 118 and an inside circumference of the rotor component 114. This makes it possible for the thickness of the bearing disk 118 to be made smaller than that of the bearing disk of FIG. 1, thus allowing the two radial bearings 122a and 122b to have a larger axial spacing. Adjoining the upper pumping seal 136 and the gap 138, there is a shorter and wider tapered space 140 which first takes up the bearing fluid when the bearing system is being filled, and then, after the filling process is over, it is covered with a covering cap 130. The capillary seal 132 with gap 134 is disposed as a fluid reservoir at the "lower" end of the spindle motor. The gap 134 is defined by an outer circumferential surface of the rotor component 114 and an inner circumferential surface of the cup-shaped first bearing component 116. The axial periphery surfaces of the gap 134 are both inclined inwards with respect to the rotational axis 146, the surface on the rotor component 114 being more strongly inclined than the surface on the bearing component 116, so that the gap 134 widens to a taper. The capillary seal 132 is protected towards the outside by a labyrinth gap 148 between the rotor component and the baseplate 110.

Figure 3:
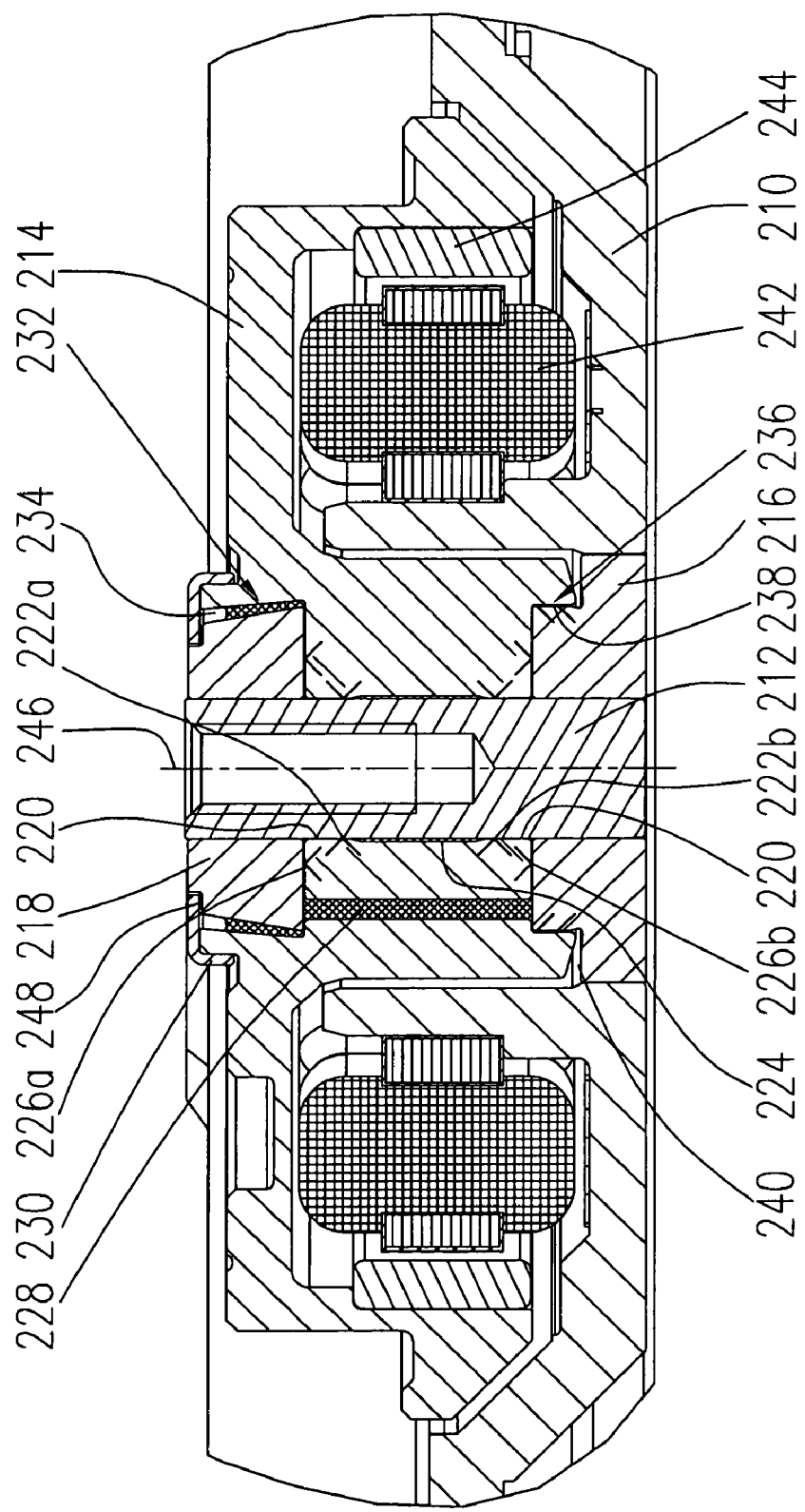
FIG. 3 shows a section through a third embodiment of the spindle motor according to the invention.

FIG. 3 shows a spindle motor having substantially the same components as the spindle motor from FIG. 1, identical components or components having identical functions being given the same reference numbers prefixed by a "2". The general description of the construction of the spindle motor from FIG. 1 also applies to the spindle motor of FIG. 3.

An important difference between the spindle motor of FIG. 3 and the spindle motor of FIG. 1 is that the lower bearing component 216 is not cup-shaped, but rather takes the form of an annular disk having a step. A pumping seal 236 is formed between a circumferential surface on the step of the bearing component 216 and an inner circumferential surface of the rotor component 216, the pumping seal 236 taking the form of an axially extending gap 238. Beyond the pumping seal 236, a radial tapering space 240 is formed. This embodiment of the spindle motor includes a construction for the lower bearing component 216 that is easy to manufacture and that is connected at its outside diameter to the baseplate 210. The upper opening of the bearing gap 220 is sealed by a tapered sealing gap 234 that forms a capillary seal 232. The gap 234 is defined by a chamfered outer circumferential surface of the disk-shaped bearing component 218 and an inner circumferential surface of the stepped rotor component 214. The surfaces adjoining the gap 234 are inclined inwards with respect to the rotational axis 246 and widen to a taper. The bearing is filled with bearing fluid via the gap 234 and then covered by a covering cap 230 that is preferably connected to the rotor component 214.

Figure 4:
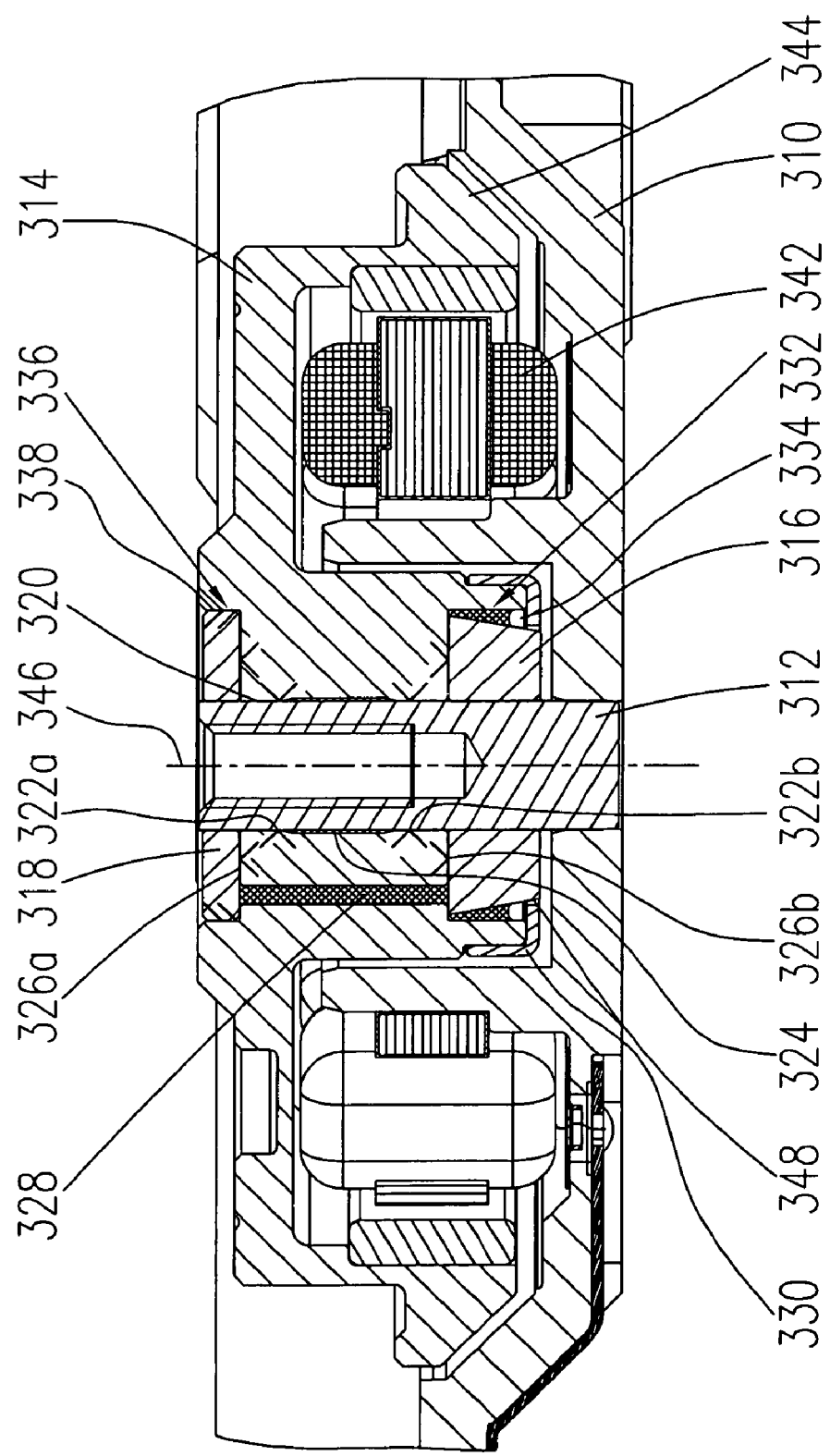
FIG. 4 shows a section through a fourth embodiment of the spindle motor according to the invention.

FIG. 4 finally shows an embodiment of the spindle motor modified with respect to FIG. 2. The general description of the spindle motor from FIG. 1 applies here, identical components or components having the same functions having the same reference numbers prefixed by a "3".

In contrast to FIG. 2, the spindle motor according to FIG. 4 provides a very simple design for the two bearing components 316 and 318 as annular disks having a cylindrical or chamfered outside circumference. The upper bearing component 318 has a small thickness, so as to give the two radial bearings 322a and 322b the largest possible axial spacing. Because of their small thickness, the upper bearing components 318 are preferably connected to the shaft 312 by welding. A pumping seal 336 is formed between the outside circumference of the upper bearing component 318 and an inside circumference of the rotor component 314. The capillary gap seal 332 is disposed between a chamfered outside circumference of the lower bearing component 316 and a collar of the rotor component 314 and is covered by a covering cap 330. The stationary shaft 312 is directly connected to the baseplate 310.

Figure 5:
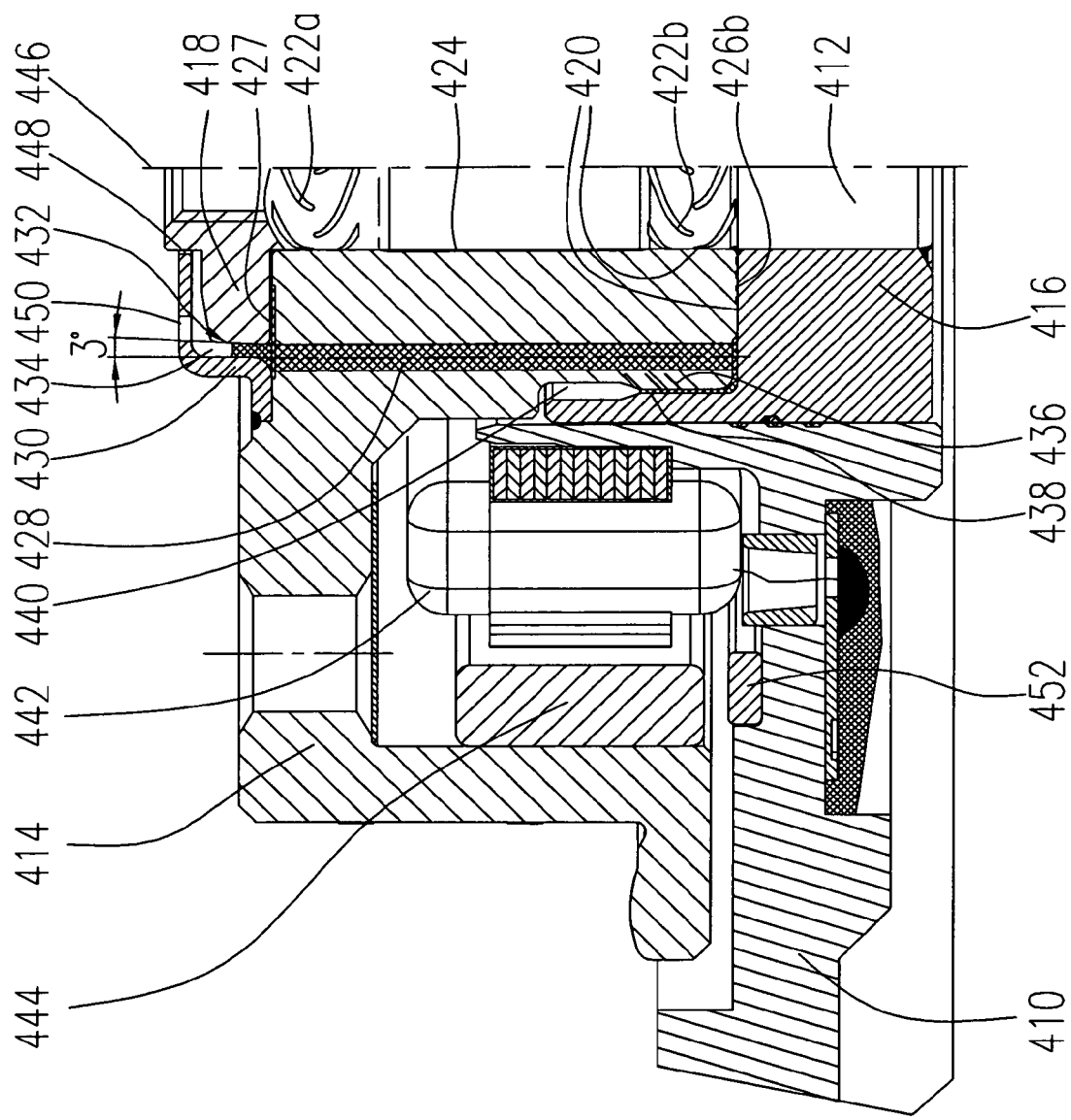
FIG. 5 shows a half section through a fifth embodiment of the spindle motor according to the invention.

FIG. 5 shows a half section through a fifth embodiment of a spindle motor according to the invention, the stationary shaft 412 being held in a first bearing component 416 which in turn is fixed in the baseplate. At the upper end of the shaft 412, a second bearing component 418 is disposed, which, in the illustrated embodiment, is integrally formed as, one piece with the shaft 412. The rotor component 414 is rotatably disposed in the space between the shaft 412 and the two bearing components 416, 418 and separated by a bearing gap 420 from the stationary bearing components 412, 416 and 418. Along the bearing gap 420, two radial bearings 422a, 422b are disposed as well as a (single) axial bearing 426b. Between the two radial bearings 422a, 422b, there is a gap-shaped groove 424 having a greater width. Beyond the axial bearing 426b, the bearing gap widens into a gap 438 that is formed between an outside circumference of the rotor component 414 and an inside circumference of the cup-shaped bearing component 416. This gap 438 forms a gap seal to which a widened space 440 is adjoined that can take up any bearing fluid escaping from the gap 438. A pumping seal 436 or 427 respectively, may be found in the region of the gap 438 as well as between the bearing component 418 and the rotor component 414. A tapered capillary seal 432 adjoins the upper pumping seal 427, the tapered capillary seal 432 being disposed between the bearing component 418 and a covering cap 430. For the most part, the gap 434 of the capillary seal 432 extends approximately parallel to the rotational axis 446, preferably inclined slightly inwards with respect to the rotational axis, and then bends by approximately 90° with respect to the direction of the rotational axis. Due to this vertical alignment of the gap 434, centrifugal forces acting on the bearing fluid have only a slight effect and the bearing fluid is kept in the gap 434. The covering cap 430, which is approximately Z-shaped in cross-section, is seated in a recess of the rotor component 414 and has an opening 450 through which the bearing can be filled with bearing fluid. An annular gap 448 remains between an edge of the covering cap 430 and the bearing component 418 (or the shaft 412 respectively), the annular gap 448 sealing the capillary seal towards the outside. The recirculation channel 428 runs from the region of the outside diameter of the lower axial bearing 426b up to the bearing gap outside the pumping seal 427 and leads directly into the gap 434 of the tapered capillary seal 432. The drive of the spindle motor is realized by electromagnetic components 442 and 444. Below the rotor magnet 444, a ferromagnetic ring 452 is mounted in the baseplate which produces the required counterforce to the axial bearing 426b. The rotor magnet may additionally have an offset in an axial direction.

Figure 6:
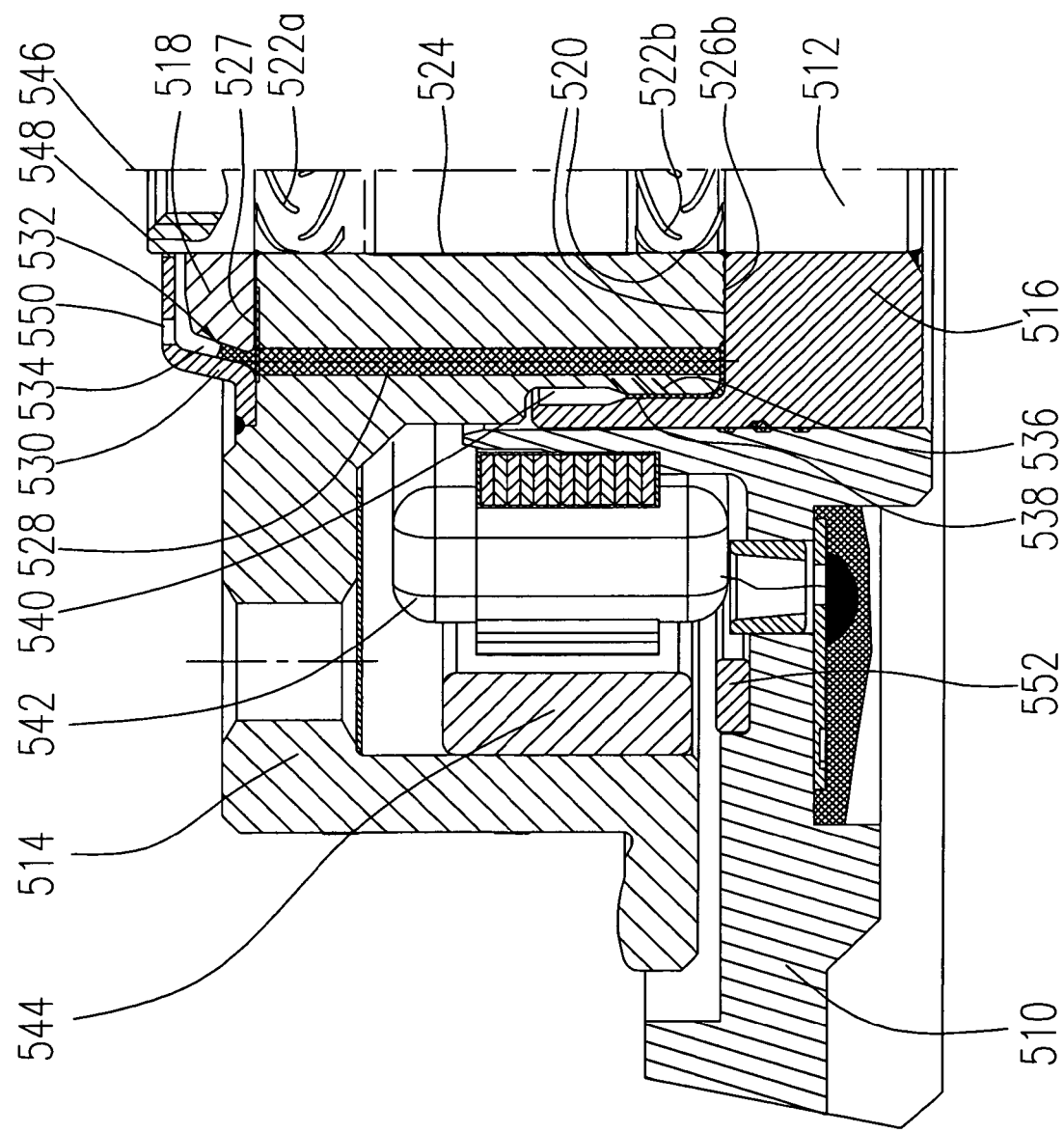
FIG. 6 shows a half section through a sixth embodiment of the spindle motor according to the invention.

FIG. 6 shows a spindle motor in the embodiment according to FIG. 5, identical components or components having identical functions being given the same reference numbers and being prefixed by a "5" rather than a "4". In contrast to FIG. 5, the spindle motor of FIG. 6 comprises a covering cap 530 that is designed approximately Z-shaped in cross-section, such that the gap 534 of the capillary seal 532 that adjoins the bearing gap in the region of the pumping seal 527 is relatively strongly inclined in the direction of the rotational axis 546, the gap then bending approximately perpendicular to the direction of the rotational axis 546. Starting from the bearing gap 520, the tapered capillary seal 532 opens up at an angle, for example, of 2° to 5°, preferably however 3°. In the section of the gap 534 that extends approximately perpendicular to the rotational axis 546, the gap 534 may become narrower, it being sealed by a gap seal 548. In FIG. 6, the upper bearing component 518 is not integrally formed with the shaft, but rather formed as a separate annular component. Below the rotor magnet 544, a ferromagnetic ring 552 is again mounted in the baseplate providing the required counterforce to the axial bearing 526*b*.

Figure 7:
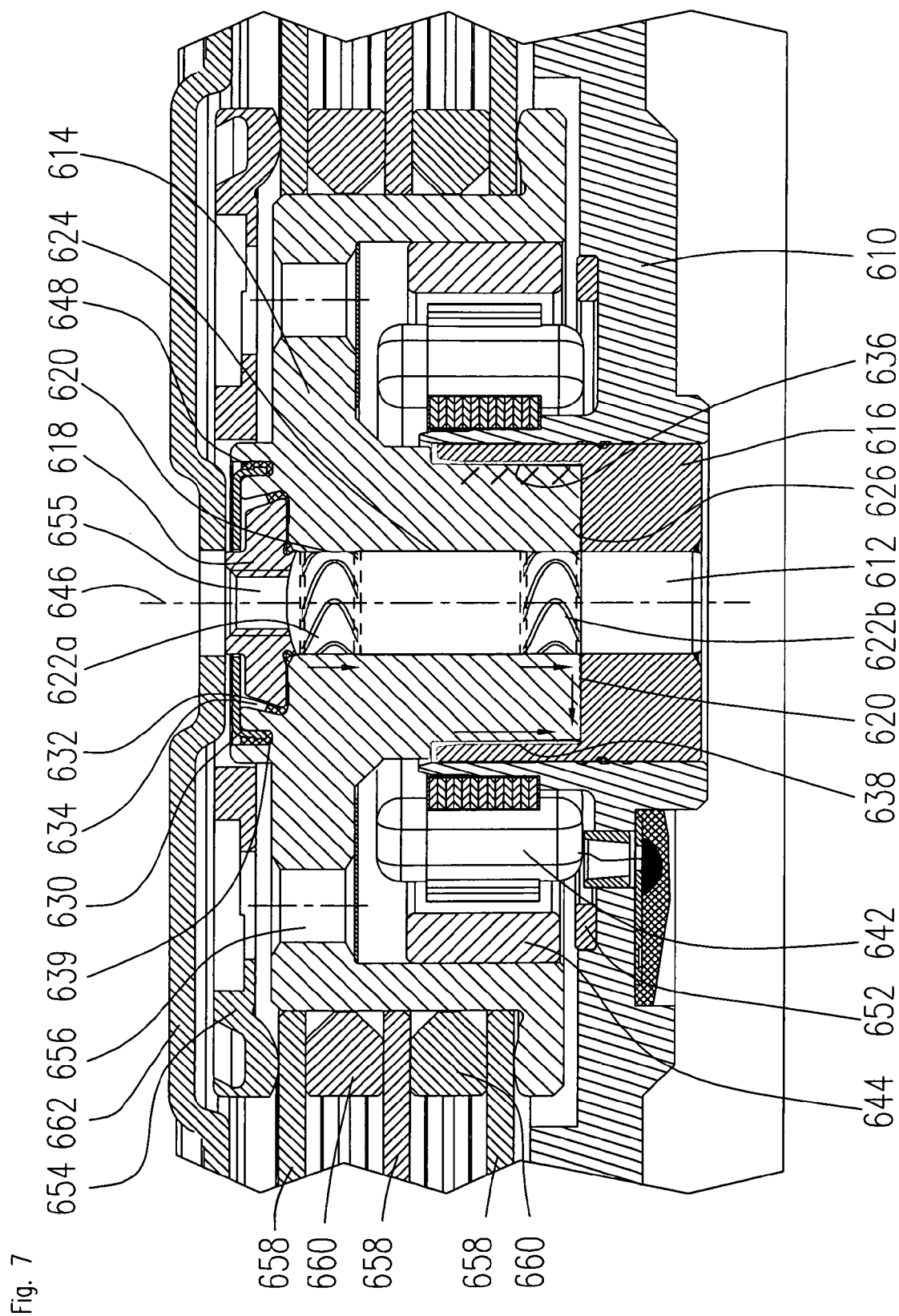
FIG. 7 shows a half section through a seventh embodiment of the spindle motor according to the invention

The spindle motor according to FIG. 7 comprises a baseplate 610 that has a substantially central cylindrical opening in which a first bearing component 616 is accommodated. The first bearing component 616 is approximately cup-shaped having a raised rim and a central opening in which the shaft 612 is fixed. A second bearing component 618 is disposed at an upper end of the stationary shaft 612 that is preferably annular in shape and integrally formed with the shaft 612 as one piece. The above-mentioned components 610, 612, 616 and 618 form the stationary components of the spindle motor. At its upper end, the shaft 612 has a tapped hole 655 for attachment to a housing cover 662 of the spindle motor or of the hard disk drive. The spindle motor further comprises a single-piece rotor component 614 that is disposed in a space formed by the shaft 612 and the two bearing components 616, 618, the rotor component 614 being rotatable with respect to these components. The upper bearing component 618 is disposed in a central recess of the rotor component 614. Adjoining surfaces of the shaft 612, the rotor component 614 and the bearing components 616, 618 are separated from one another by a bearing gap 620 open at both ends that is filled with bearing fluid, such as a bearing oil. The electromagnetic drive system of the spindle motor is formed in a well-known manner by a stator arrangement 642 disposed on the baseplate 610 and an annular permanent magnet 644 enclosing the stator arrangement at a spacing, the permanent magnet 644 being disposed on an inner circumferential surface of the rotor component 614.

The rotor component 614 of the spindle motor has a hollow cylindrical section, that is designed in such a way that its inside circumference forms two cylindrical bearing surfaces which are separated by a groove 624 running in between. These bearing surfaces enclose the stationary shaft 612 at a distance of only a few micrometers while forming the bearing gap 620 and are provided with appropriate grooved patterns, so that, together with the respective opposing bearing surfaces of the shaft 612, they form two fluid dynamic radial bearings 622*a* and 622*b*.

A radially extending section of the bearing gap 620 adjoins the lower radial bearing 622*b* which is formed by radially extending bearing surfaces of the rotor component 614 and corresponding opposing bearing surfaces of the bearing component 616. These bearing surfaces form a fluid dynamic axial bearing 626 having bearing surfaces taking the form of circular rings perpendicular to the rotational axis 646. The fluid dynamic axial bearing 626 preferably has herringbone grooved patterns that can be formed either on the rotor component 614, on the bearing component 616 or on both parts. The grooved patterns of the axial bearing 626 preferably extend over the entire end face of the rotor component, in other words from the inner rim right up to the outer rim. This goes to produce a defined distribution of pressure in the entire axial bearing gap and negative pressure zones are avoided since the grooved patterns over the entire surface of the axial bearing are involved in generating a defined pressure. It could be advantageous if all the grooved patterns required for the radial bearings 622*a*, 622*b* and the axial bearing 626 are disposed on the rotor component 614, thus simplifying the manufacture of the bearing, particularly the manufacture of the shaft 612 and the bearing component 616.

A sealing gap 638 proportionally filled with bearing fluid adjoins the radial section of the bearing gap 620 in the region of the axial bearing 626, the sealing gap 638 being formed by the opposing surfaces of the rotor component 614 and the bearing component 616 and sealing the end of the fluid bearing system at this end. The sealing gap 638 extends substantially axially and parallel to the rotational axis 646 and is defined by an inner circumferential surface of the rotor component 614 and an outer circumferential surface of the bearing component 616. In the region of the sealing gap 638, a pumping seal 636 is provided that is marked by grooved patterns which are disposed on the surface of the bearing component 616 and/or of the rotor component 614. When the rotor component 614 rotates with respect to the bearing component 616, the grooved patterns of the pumping seal 636 generate a pumping effect on the bearing fluid found in the gap 638 in the direction of the interior of the bearing, i.e. towards the bearing gap 620.

At the other end of the fluid bearing system, the rotor component 614 adjoining the upper radial bearing 622*a* is designed such that it forms a radially extending surface, which, together with a corresponding opposing surface of the bearing component 618 forms a narrow gap 632 whose width is wider than the width of the bearing gap 620 in the region of the radial bearings. In the region of this gap 632, a dynamic pumping seal may be disposed that is marked by appropriate pumping patterns taking the form of spiral grooves on the surfaces of the rotor component 614, the bearing component 618 or both parts and seals the fluid bearing system at this end. The gap widens at its outer end and leads into a sealing gap 634 preferably having a tapered cross-section. The sealing gap 634 extends substantially axially and is defined by the opposing surfaces of the rotor component 614 and the bearing component 618 that are preferably inclined inwards with respect to the rotational axis 646. This ensures that the bearing fluid, on rotation of the bearing, is pressed towards the interior in the direction of the bearing gap 620 due to centrifugal forces. The sealing gap 634 may be covered by an annular covering cap 630. The covering cap 630 is held in an annular groove 639 in the rotor component 614 and bonded in place, for example. Together with the end of the shaft 612, the covering cap 630 forms a labyrinth seal 648. This goes to increase the certainty that no bearing fluid can leak out of the sealing gap 634. Alongside its function as a capillary seal, the sealing gap 634 also acts as a fluid reservoir and supplies the amount of fluid necessary for the useful life of the bearing (evaporation). Moreover, filling tolerances and any thermal expansion of the bearing fluid can be compensated.

The radial bearings 622*a*, 622*b* each comprise a number of half-sine shaped bearing grooves that pump the bearing fluid in the bearing gap 620 in both axial directions. Because the branches of the bearing grooves have different lengths, asymmetric radial bearings 622*a*, 622*b* are produced that have an overall pumping direction directed in the direction of the axial bearing 626. The axial bearing 626 has herringbone patterned bearing grooves whose overall pumping direction is directed radially outwards in the direction of the gap 638.

The pumping seal 636 pumps in the opposite direction as do the two radial bearings 622*a*, 622*b* and the axial bearing 626. This means that the pressure generated by the pumping seal 636 has to be at least great enough to compensate the pressure generated by the radial bearings 622*a*, 622*b* and the axial bearing 626. A recirculation channel that connects the opposing ends of the bearing gap 620 to each other can be dispensed with. This means a reduction in the amount of bearing fluid required in the bearing, since a recirculation channel need not be filled, and a decreased risk of air bubbles being formed in the region of the recirculation channel where they easily combine to form larger air bubbles.

To be able to perform the described functions and to ensure ease of assembly of the motor, the two bearing components 616, 618, which are fixedly connected to the shaft 612, by means, for example, of an integral design or by pressing, bonding or welding, are of course given an appropriate design. It may be particularly favorable to design one of the two bearing components, for example, part 616, to be cup-shaped having a raised rim, so that, together with an opposing surface of the rotor component 614, it forms the sealing gap 638 at its inner circumferential surface, and at its outside circumference it is connected to the baseplate 610. On the other hand, the simplest possible design for the bearing components 616, 618 may be advantageous, such as a chamfered or even straight circular disk, like bearing component 618 for example.

Since the entire rotor of the spindle motor (apart from magnet 644 and a covering cap 630 where applicable) preferably consists merely of the rotor component 614, the position tolerance of the rotor surfaces, which are used, for example, as supporting surfaces for the storage disks of a hard disk drive, is better with respect to the fluid bearing than for a rotor consisting of several parts and the mechanical stability is considerably greater. Moreover, the functional surfaces (bearing surfaces) of the fluid bearing system, all of which are located on one part, preferably the rotor component 614, can be relatively easily manufactured to the required precision. In particular, compared, for example, to a considerably smaller bearing bush of a conventional design, the rotor component 614 can be relatively easily clamped into a chuck and the final processing of almost all the bearing surfaces can be carried out without having to rechuck. What is more, it is now possible to dispense with the assembly of the rotor from several separate parts, which is difficult particularly for small form factors and inevitably associated with failures, and where the separate parts together have to incorporate all the functional surfaces necessary for a fluid bearing system with the required precision and additional, specially designed close-tolerance connecting regions.

Because the bearing is mounted in the first bearing component 616, which acts as a flange for connection to the baseplate 610, it is possible to mount the fluid bearing as a structural unit, to fill it with bearing fluid and to test it before the fluid bearing is connected as a structural unit to the baseplate 610.

Since the spindle motor has only one fluid dynamic axial bearing 626 that generates a force upwards in the direction of the second bearing component 618, a corresponding counter-force or preload force has to be provided that keeps the bearing system in axial balance. For this purpose, the baseplate 610 may have a ferromagnetic ring 652 that lies axially opposite the rotor magnet 644 and is magnetically attracted by the rotor magnet 644. This magnetic force of attraction acts in opposition to the force of the axial bearing 626 and keeps the bearing axially stable. As an alternative or in addition to this solution, the stator arrangement 642 and the rotor magnet 644 may be disposed at an axial offset with respect to one another, in such a way that the rotor magnet 644 is disposed axially further away from the baseplate 610 than the stator arrangement 642. Through the magnetic system of the motor, an axial force is thereby built up that acts in the opposite direction to the axial bearing 626.

The outer cup-shaped part of the rotor component 614 is provided for the purpose of attaching the storage disks 658 of the hard disk drive. The annular disk-shaped storage disks 658 rest on a lower, radially outwards aligned collar of the rotor component 614 and are separated from one another by spacers 660. The storage disks 658 are held by a holding piece 654 that is fixed by means of screws (not illustrated) in tapped holes 656 in the rotor component 614.

| Identification Reference List | |
|---|---|
| 10, 110, 210, 310, 410, 510, 610 | Baseplate |
| 12; 112, 212, 312, 412, 512, 612 | Shaft |
| 14, 114, 214, 314, 414, 514, 614 | Rotor component |
| 16, 116, 216, 316, 416, 516, 616 | Bearing component |
| 18, 118, 218, 318, 418, 518, 618 | Bearing component |
| 20, 120, 220, 320, 420, 520, 620 | Bearing gap |
| 22a, 22b, 122a, 122b, 222a, 222b, 322a, 322b, 422a, 422b, 522a, 522b, 622a, 622b | Radial bearing |
| 24, 124, 224, 324, 424, 524; 624 | Groove |
| 26a, 26b, 126a, 126b, 226a 226b, 326a, 326b, 426b, 526b 626a, 626 | Axial bearing |
| 427, 527 | Pumping seal |
| 28, 128, 228, 328, 428, 528 | Recirculation channel |
| 30, 130, 230, 330, 430, 530, 630 | Covering cap |
| 32, 132, 232, 332, 432, 532, 632 | Capillary seal |
| 34, 134, 234, 334, 434, 534, 634 | Gap (tapered) |
| 36, 136, 236, 336, 436, 536, 636 | Pumping seal |
| 38, 138, 238, 338, 438, 538, 638 | Gap |
| 639 | Annular groove |
| 40, 140, 240, 340, 440, 540 | Space |
| 42, 142, 242, 342, 442, 542, 642 | Stator arrangement |
| 44, 144, 244, 344, 444, 544, 644 | Magnet |
| 46, 146, 246, 246, 446, 546, 646 | Rotational axis |
| 48, 148, 248, 348, 448, 548, 648 | Labyrinth seal |
| 450, 550 | Opening |
| 452, 552, 652 | Ferromagnetic ring |
| 654 | Holding piece |
| 655 | Tapped hole (shaft) |
| 656 | Tapped hole (rotor component) |
| 658 | Storage disks |
| 660 | Spacer |
| 662 | Housing cover |

The invention claimed is:

1. A spindle motor having a fluid dynamic bearing system comprising:
   a stationary shaft (12; 112; 212; 312; 412; 512; 612) that is held in a baseplate (10; 110; 210; 310; 410; 510; 610),
   a single-piece rotor component (14; 114; 214; 314; 414; 514; 614) rotatably supported with respect to the shaft about a rotational axis (46, 146, 246, 246, 446, 546, 646),
   two radial bearings (22; 122; 222; 322; 422; 522; 622) formed between opposing radial bearing surfaces of the shaft (12; 112; 212; 312; 412; 512; 612) and of the rotor component (14; 114; 214; 314; 414; 514; 614),
   at least one axial bearing (26; 126; 226; 326; 426; 526; 526), formed between opposing axial bearing surfaces of the rotor component (14; 114; 214; 314; 414; 514; 614) and a first bearing component (16; 116; 216; 316; 416; 516; 616) or of the rotor component (14; 114; 214; 314; 414; 514; 614) and a second bearing component (18; 118; 218; 318; 418; 518; 618), whereby the second bearing component is stationary and has an annular shape and is disposed at an upper end of the stationary shaft,
   a bearing gap (20; 120; 220; 320; 420; 520; 620) open at both ends and filled with bearing fluid that separates the adjoining surfaces of the shaft (12; 112; 212; 312; 412; 512; 612), the rotor component (14; 114; 214; 314; 414; 514; 614) and the first and second bearing components (16; 116; 216; 316; 416; 516; 526; 18; 118; 218; 318; 418; 518; 618) from one another, a tapered capillary seal (32; 132; 232; 332; 432; 532) formed between a circumferential surface of the rotor component (14; 114; 214; 314; 414; 514) or a covering cap (430; 530) and an inclined surface of the first bearing component (116; 316) or the second bearing component (18; 118; 418; 518), whereby at least one of the two surfaces forming the capillary seal is inclined at an acute angle to the rotational axis, a pumping seal and/or gap seal (138; 238; 338; 438; 538) formed between an inner circumferential surface of the rotor component (114; 214; 314; 414; 514) and an outer circumferential surface of the first bearing component (216; 416; 516) or the second bearing component (116; 316) comprising a gap which extends parallel to the bearing gap, but not in extension of the vertical section of the bearing gap, and an electromagnetic drive system (42; 142; 242; 342; 442; 542; 642; 44; 144; 244; 344; 444; 544; 644).

2. A spindle motor according to claim 1, characterized in that two axial bearings (26a; 26b; 126a, 126b; 226a, 226b; 326a, 326b) are formed between the opposing axial bearing surfaces of the rotor component (14; 114; 214; 314) and a first bearing component (16; 116; 216; 316).

3. A spindle motor according to claim 1, characterized in that only one axial bearing (426; 526; 626) is formed between the opposing axial bearing surfaces of the rotor component (14; 414; 514; 614;) and a first bearing component (416; 516; 616) or of the rotor component (414; 514; 614) and a second bearing component (416; 516; 616).

4. A spindle motor according to claim 1, characterized in that a ferromagnetic ring (452; 552; 652) is mounted on the baseplate below a rotor magnet (444; 544; 644) of the electromagnetic drive system.

5. A spindle motor according to claim 1, characterized in that the bearing system merely comprises a total of four mechanical components.

6. A spindle motor according to claim 1, characterized in that it contains only one rotating, mechanical rotor component (14; 114; 214; 314; 414; 514: 614) taking the form of a hub/bearing bush arrangement.

7. A spindle motor according to claim 1, characterized in that the radial bearings (622a, 622b) and the axial bearing (626) have pressure generating bearing grooves that pump the bearing fluid mainly in a first direction whereas the pumping seal (636) has pressure generating grooved patterns that pump the bearing fluid in an opposite second direction.

8. A spindle motor according to claim 7, characterized in that the pressure generated by the pumping seal (636) is at least great enough to compensate the pressure generated by the radial bearings (622a, 622b) and the axial bearing (626).

9. A spindle motor according to claim 1, characterized in that the capillary seal (32; 232; 332; 432; 532; 632) is covered by an annular covering cap (30; 230; 330; 430; 530; 630) connected to the rotor component (14; 214; 314; 414; 514; 614), which, together with a bearing component, forms a labyrinth seal (48; 248; 348; 448; 548; 648).

10. A spindle motor according to claim 1, characterized in that the pumping seal (136) is covered by an annular covering cap (130) connected to the rotor component (114), which, together with a bearing component, forms a labyrinth seal.

11. A spindle motor according to claim 1, characterized in that the rotor component (14; 114; 214; 314; 414; 514) contains a recirculation channel (28; 128; 228; 328; 428; 528) that connects the axial surfaces or bearing surfaces of the rotor component to each other.

12. A spindle motor according to claim 1, characterized in that a pumping bearing (427; 527) is formed between the surface of the bearing component (418; 518) and the rotor component (414; 514).

13. A hard disk drive having a housing, a spindle motor for driving in rotation at least one storage disk and a read/write device for reading and writing data from and on the storage disk, the spindle motor comprising a fluid dynamic bearing system, a stationary shaft (12; 112; 212; 312; 412; 512; 612) that is held in a baseplate (10; 110; 210; 310; 410; 510; 610), a single-piece rotor component (14; 114; 214; 314; 414; 514; 614) rotatably supported with respect to the shaft about a rotational axis (46, 146, 246, 246, 446, 546, 646), two radial bearings (22; 122; 222; 322; 422; 522; 622) formed between the opposing radial bearing surfaces of the shaft (12; 112; 212; 312; 412; 512; 612) and of the rotor component (14; 114; 214; 314; 414; 514; 614), at least one axial bearing (26; 126; 226; 326; 426; 526; 526) formed between the opposing axial bearing surfaces of the rotor component (14; 114; 214; 314; 414; 514; 614) and a first bearing component (16; 116; 216; 316; 416; 516; 616) or of the rotor component (14; 114; 214; 314; 414; 514; 614) and a second bearing component (18; 118; 218; 318; 418; 518; 618), whereby the second bearing component is stationary and has an annular shape and is disposed at an upper end of the stationary shaft, a bearing gap (20; 120; 220; 320; 420; 520; 620) open at both ends and filled with bearing fluid, that separates the adjoining surfaces of the shaft (12; 112; 212; 312; 412; 512; 612), the rotor component (14; 114; 214; 314; 414; 514; 614) and the first and second bearing components (16; 116; 216; 316; 416; 516; 526; 18; 118; 218; 318; 418; 518; 618) from one another, a tapered capillary seal (32; 132; 232; 332; 432; 532) formed between a circumferential surface of the rotor component (14; 114; 214; 314; 414; 514) or a covering cap (430; 530) and an inclined surface of the first bearing component (116; 316) or the second bearing component (18; 118; 418; 518), whereby at least one of the two surfaces forming the capillary seal is inclined at an acute angle to the rotational axis, a pumping seal and/or gap seal (138; 238; 338; 438; 538) formed between an inner circumferential surface of the rotor component (114; 214; 314; 414; 514) and an outer circumferential surface of the first bearing component (216; 416; 516) or the second bearing component (116; 316) comprising a gap which extends parallel to the bearing gap, but not in extension of the vertical section of the bearing gap, and an electromagnetic drive system (42; 142; 242; 342; 442; 542; 642; 44; 144; 244; 344; 444; 544; 644).

* * * * *